United States Patent
Albaugh et al.

(10) Patent No.: US 6,375,913 B1
(45) Date of Patent: Apr. 23, 2002

(54) INTEGRATION OF CERAMIC MEMBRANE INTO A SILICON OXIDE PRODUCTION PLANT

(75) Inventors: Kevin Bruce Albaugh, Williamsville, NY (US); Nitin Ramesh Keskar, Lewisville, TX (US)

(73) Assignee: Pranair Technology, Danbury, CT (US)

( * ) Notice: Subject to any disclaimer, the term of this patent is extended or adjusted under 35 U.S.C. 154(b) by 0 days.

(21) Appl. No.: 09/545,850

(22) Filed: Apr. 10, 2000

(51) Int. Cl.$^7$ .............................................. C01B 33/12
(52) U.S. Cl. ...................... 423/335; 205/358; 205/362; 422/198
(58) Field of Search ................................ 205/549, 358, 205/633, 362, 344; 423/335, 325, 235, 479; 422/198

(56) References Cited

U.S. PATENT DOCUMENTS

| | | | |
|---|---|---|---|
| 4,761,209 A | * 8/1988 | Bonaventura et al. | 204/129 |
| 5,152,819 A | * 10/1992 | Blackwell et al. | 65/3.12 |
| 5,169,415 A | * 12/1992 | Roettger et al. | 55/68 |
| 5,306,411 A | 4/1994 | Mazanec et al. | 204/265 |
| 5,380,467 A | 1/1995 | Lin et al. | 252/520 |
| 5,547,494 A | 8/1996 | Prasad et al. | 95/54 |
| 5,580,497 A | 12/1996 | Balachandram et al. | 252/519 |
| 5,616,223 A | * 4/1997 | Shen et al. | 204/295 |
| 5,888,272 A | 3/1999 | Prasad et al. | 95/54 |
| 5,989,634 A | * 11/1999 | Isenberg | 427/255.32 |

FOREIGN PATENT DOCUMENTS

WO   WO95/27810   10/1995

* cited by examiner

*Primary Examiner*—Steven P. Griffin
*Assistant Examiner*—Edward M. Johnson
(74) *Attorney, Agent, or Firm*—David M. Rosenblum

(57) ABSTRACT

An integrated system for producing high purity silicon dioxide comprising: a) a source of an oxygen-containing feed gas containing at least one impurity, b) an oxygen transport membrane cell containing an oxygen-selective transport membrane that has a cathode side and an opposing anode side, the membrane being at an elevated temperature effective for separation of oxygen in the feed gas from the impurity by transporting oxygen ions from the oxygen-containing feed gas through the membrane to the anode to form a purified oxygen permeate on the anodeside, while retaining an essentially oxygen-depleted, impurity-containing retentate on the cathode side, c) a passageway from the source (a) to the cathode side of the membrane cell, d) a silicon source, and e) a silicon oxidation furnace, in communication with the anode side of the membrane cell, for reaction of the purified oxygen permeate with silicon from the silicon source, at an elevated reaction temperature effective for the reaction, in order to produce the high purity silicon dioxide.

16 Claims, 3 Drawing Sheets

INTEGRATION OF CERAMIC MEMBRANE INTO A SILICON OXIDE PRODUCTION PLANT

FIELD OF THE INVENTION

This invention relates to an integrated system comprising an oxygen selective ion transport membrane cooperating with a silicon oxidation furnace to provide ultra-high purity oxygen to the furnace as a reactant for producing a highly pure silicon dioxide coating. This integrated system affords a particular advantage inasmuch as the heat source employed for efficient operation of the silicon oxidation furnace is also suitably employed to provide a desired elevated temperature for efficient operation of the membrane, thereby insuring production of the desired high-purity oxygen permeate.

BACKGROUND OF THE INVENTION

Silicon dioxide is a key component for the manufacturing of semiconductors. Conventional processes for oxidizing silicon to form silicon dioxide typically employ oxygen-containing reactants, such as oxygen, air, steam, or a combination thereof, in furnaces that operate at high temperatures, such as from about 900° C. to about 1,000° C. The quality of the silicon dioxide coatings produced by the oxidation process is adversely affected by the presence of impurities in the gas phase of the reactor, and the semiconductor industry demands highly pure coatings. Accordingly, oxygen itself, in very pure form, is the preferred reactant for providing thin-layer films of silicon dioxide, typically having a film thickness of from 5 to 10 nanometers (nm). More particularly, ultra-high purity (so-called "UHP") oxygen containing contaminants in a total amount not exceeding 100 parts per billion is desirably employed to oxidize the silicon to form silicon dioxide having the desired coating purity.

In order to achieve the required high level of silicon dioxide purity, contaminants such as argon (Ar) and krypton (Kr), as well as hydrocarbons, nitrogen, and other contaminants that tend to adversely affect the quality and/or growth of the coating, are removed from the oxygen reactant before effecting silicon oxidation. Several methods are known for "off-site" production of the desired UHP oxygen. After off-site production, the UHP oxygen is then suitably shipped to the site of the semiconductor plant for use in the oxidation furnace. Heretofore, off-site UHP oxygen production was typically done by cryogenic distillation of air to form so-called "high purity" (also referred to as "HP") oxygen, containing no more than 0.5% by weight of impurities, followed by further refinement of the HP oxygen to produce the desired UHP oxygen. This process is expensive, and the resulting UHP oxygen must then be shipped to the site of the silicon dioxide plant for use as desired. Further, if this expensive methodology is used "on-site" to purify the bulk oxygen supply to a microelectronics plant, the cost becomes prohibitively expensive. Moreover, such "bulk" purification methodology typically results in wasted oxygen purification efforts when used to produce oxygen reactant for portions of the plant that do not require such high purity, UHP oxygen, since the requirements for UHP material are typically localized within the plant.

Another method that is useful for producing contaminant free oxygen for use in industrial application involves the utilization of an oxygen selective ion transport (ceramic) membrane. These ceramic membranes are capable of selectively transporting oxygen ions across the membrane, and are used to separate pure oxygen from gas mixtures in a variety of industrial applications, although not heretofore in combination with a silicon oxidation furnace.

Ceramic membranes formed from solid electrolytes and mixed conducting oxides typically exhibit the property of oxygen selectivity. "Oxygen selectivity" means that only oxygen ions are transported across the membrane, while other elements and ions are excluded. These mixed conductor ceramic membranes (also referred to as "ionic/mixed conductor membranes") are known to be generally useful for purifying oxygen, although not heretofore in combination with a silicon oxidation furnace.

By way of illustration, U.S. Pat. No. 5,306,411 (to Mazanec et al) discloses that ceramic membranes are suitably employed to produce oxygen for oxidation reactors. Additionally, U.S. Pat. No. 5,580,497 (to Balachandan et al) teaches the use of dense ceramic ion conductors that are suitably used to produce high purity oxygen. Further, U.S. Pat. No. 5,380,467 (to Ching-Yu Lin) teaches that ionic conductors are suitably used to produce high purity oxygen in an pressure-driven mode, whereas International Patent Application WO 95/27810 (to Renlund et al) describes such production utilizing the ionic conductor in an electrically-driven mode. None of these patents disclose the use o f a ceramic membrane for oxygen purification in connection with a silicon oxidation plant.

In view of the inconvenience and expense associated with known methods for supplying UHP oxygen to silicon oxidation furnaces, the microelectronic components manufacturing community has a need for a system for cost effectively producing on-site UHP oxygen within, or in close proximity to, the silicon oxidation furnace itself. The present invention provides an answer to that need.

OBJECTS OF THE INVENTION

It is therefore an object of the invention to provide a process for integrating a mixed conductor ceramic membrane into the operation of a silicon oxidation furnace for oxidizing silicon to form silicon dioxide, and to take advantage of the energy efficiencies associated therewith.

It is a further object of this invention to provide a process that will provide UHP oxygen to specific site(s) within a silicon oxidation furnace requiring such UHP oxygen, while avoiding the requirement to ship UHP oxygen from outside the plant or use it throughout the factory environment.

Yet another object of this invention is to integrate the operation of a silicon oxidation furnace, used to form silicon dioxide and typically operating at temperatures in excess of 900° C., to provide heat for an integrated selective oxygen transport membrane cell. This facilitates using the same heat source that is required for the operation of the oxidation furnace to provide the high temperatures required for the proper functioning of the membrane.

SUMMARY OF THE INVENTION

In one aspect, the present invention relates to an integrated system for producing high purity silicon dioxide comprising:

a) a source of an oxygen-containing feed gas containing at least one impurity, b) an oxygen transport membrane cell containing an oxygen-selective transport membrane that has a cathode side and an opposing anode side, said membrane being at an elevated temperature effective for separation of oxygen in said feed gas from said impurity by transporting oxygen ions from said oxygen-containing feed gas through said membrane to said anode to form a purified oxygen permeate on said anode side, while retaining an oxygen-depleted, impurity-containing retentate on said cathode side, c) a passageway from said source (a) to the cathode side of said membrane cell, d) a silicon source, (commonly a silicon wafer), and e) a silicon oxidation furnace, in communication with said anode side of said membrane cell, for reaction of said purified oxygen permeate with silicon from said silicon source, at an elevated reaction temperature effective for said reaction, in order to produce said high purity silicon dioxide.

In another aspect, the present invention relates to a process for producing a high purity silicon dioxide coating on a substrate comprising contacting a surface of the substrate with silicon dioxide produced using the above-described integrated system.

In yet another aspect, the present invention relates to a method for preparing pure silicon dioxide comprising the steps of:

A) feeding an oxygen-containing feed gas into a cathode side of an oxygen transport membrane cell containing said cathode side and an anode side, with an oxygen transport membrane therebetween, B) selectively transporting oxygen ions from said oxygen-containing feed gas from said cathode side through said membrane to said anode side to provide a purified oxygen permeate, C) reacting said purified oxygen permeate with silicon in a silicon oxidation furnace to form high purity silicon dioxide.

In still another aspect, the present invention relates to an integrated system for the delivery of high purity oxygen to a silicon oxidation furnace and for using the high purity oxygen to prepare high purity silicon dioxide comprising:

a) an oxygen transport membrane cell containing an oxygen selective ion transport membrane that has a cathode side and an opposing anode side and is at a temperature effective for the transport of permeate oxygen from said cathode side to said anode side, b) an oxygen-containing feed gas contacting said cathode side wherein oxygen ions from said feed gas are transported to said anode side to provide an oxygen permeate, and an oxygen-depleted retentate is retained as an effluent stream on said cathode side, c) reacting a reaction mixture comprising said oxygen permeate and silicon from a silicon source in a silicon oxidation furnace heated to an elevated temperature sufficient to react the reaction mixture, thereby forming said high purity silicon dioxide.

These and other aspects will become apparent upon reading the detailed description of the invention.

DETAILED DESCRIPTION OF THE INVENTION

Figure 1:
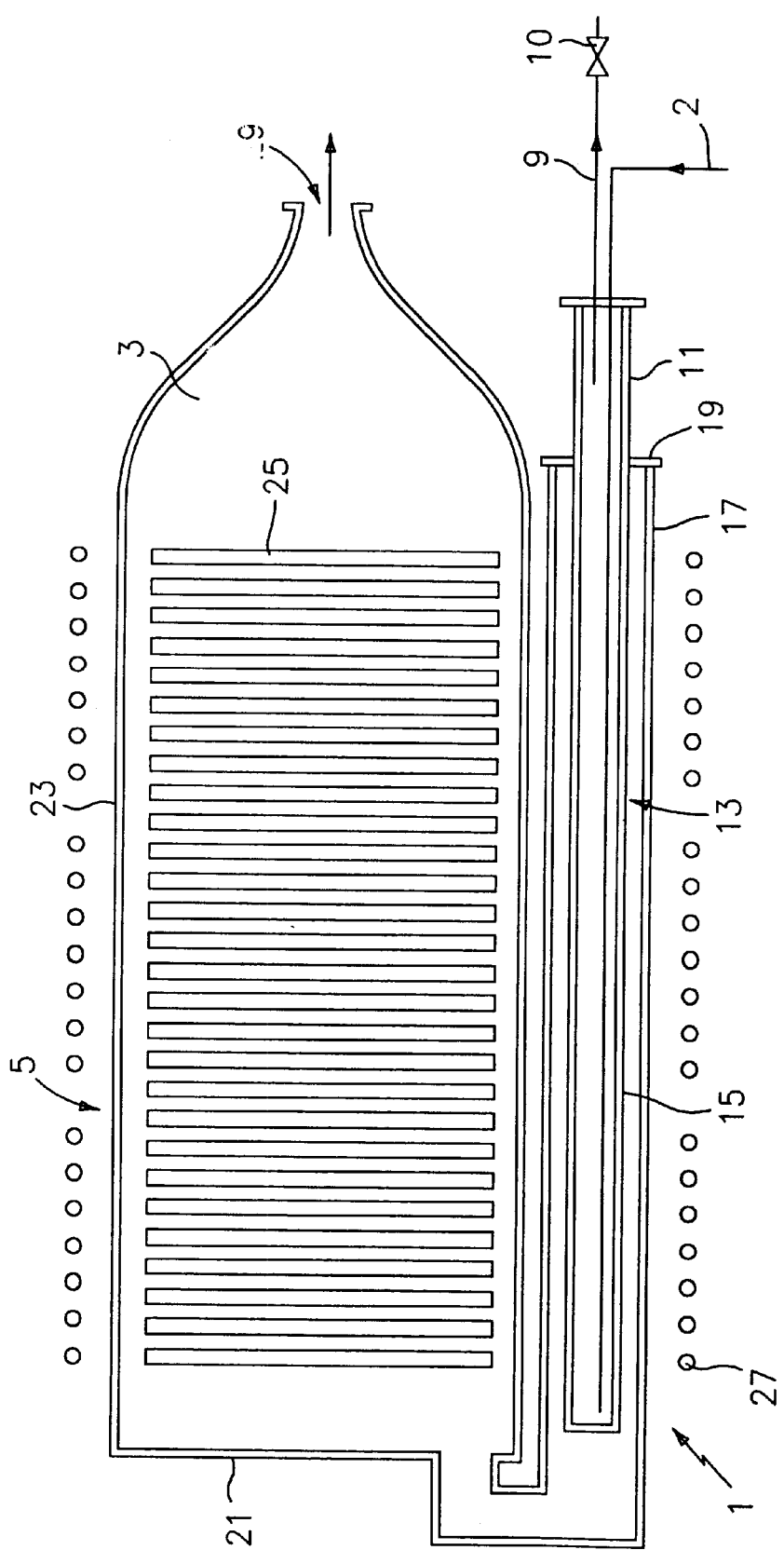
FIG. 1 is a schematic diagram of a ceramic membrane tube integrated with the operation of an oxidation furnace said ceramic membrane located external to said furnace.

It has now been surprisingly found, in accordance with the present invention, that the integration of ceramic membrane cell within, or in close proximity to, a silicon oxidation plant provides practical advantage for the operation of the plant. More specifically, integration of ceramic membrane technology into the oxidation furnace provides the membrane with an elevated temperature environment that facilitates purification of the oxygen, and concomitant removal of inert and reactive impurities, at high efficiency. More specifically, the integrated system of the present invention capitalizes upon the availability of heat from the furnace to facilitate efficient oxygen purification, thereby providing UHP oxygen for use as a reactant in the silicon oxidation furnace.

Thus, in a specific embodiment, the present invention employs a ceramic membrane in cooperation with a silicon oxidation furnace in order to provide an "on-site" vehicle for producing the required UHP oxygen for use in the furnace. Advantageously, heat for efficient membrane purification of the oxygen is suitably provided using the same heat source as is used to heat the furnace. Thus, required UHP oxygen is produced, and utilized in the furnace for oxidation of the silicon, without incurring significant additional energy expense that otherwise would be needed to maintain the membrane at an elevated temperature suitable for efficient UHP oxygen production.

Conventional silicon oxidation furnaces are easily adapted in order to accommodate the system of the present invention for providing UHP oxygen by (a) the acquisition of an oxygen supply (e.g., oxygen or atmospheric air) and (b) the purchase and integration of the ceramic membrane system with the furnace. By using this methodology, the UHP produced is directly utilized where needed, namely at the locus of the silicon oxidation furnace.

In contradistinction to the present invention, commonly owned U.S. Pat. No. 5,888,272, incorporated by reference herein in its entirety, discloses methods for integrating an oxygen transport membrane into a furnace to produce the oxygen for oxygen-enriched combustion, as well as to provide nitrogen for use in the furnace atmosphere. In one embodiment of that application, the oxygen transport membrane is disclosed as being placed inside a furnace. Alternatively, the oxygen transport membrane may be located outside of the furnace. That application does not disclose a silicon oxidation furnace, much less the advantages associated in integrating the membrane into such a furnace.

The terms "ceramic membrane" and "oxygen transport membrane" are used herein to designate membranes that selectively pass oxygen to the exclusion of other gases and elements. The term "mixed conductor ceramic membrane" as used herein refers to any ceramic membrane structure or any ionic/mixed conductor membrane structure or any equivalent membrane structure that is suitable for selectively passing oxygen ions from an impure oxygen-containing gas stream (e.g. air) across the membrane to provide a pure oxygen permeate effluent gas stream.

The pure oxygen permeate gas stream typically comprises pure oxygen or a high purity oxygen defined as a gas generally containing at least about 95 volume % $O_2$, more preferably more than about 99 volume % (most preferably more than 99.9 volume %) of oxygen.

Certain membrane materials, referred to as "mixed conductors", conduct both oxygen ions and electrons. At elevated temperatures, generally in excess of 400° C., these materials contain mobile oxygen-ion vacancies that provide conduction sites for selective transport of oxygen ions through the material. The transport is driven by partial pressure of oxygen ($p_{O2}$) across the membrane: $O^-$ ions flow from the side with high $p_{O2}$ to that with low $p_{O2}$. Ionization of $O_2$ to $O^-$ takes place on the "cathode side" of the membrane, which are transported across the membrane. The $O^-$ ions deionize on the "anode side" releasing $O_2$ molecules.

For materials that exhibit only ionic conductivity, external electrodes are placed on the surfaces of the electrolyte and the electronic current is carried in an external circuit. In "mixed conducting" materials, electrons are transported to the cathode internally, thus completing the circuit and obviating the need for external electrodes. Dual phase conductors, in which an oxygen-ion conductor is mixed with an electronic conductor, may also be used for the same applications.

U.S. Pat. No. 5,306,411 by Manzanec et al., incorporated by reference in its entirety herein, discloses applications of a mixed conductor membrane for the production of oxygen. The membrane has two solid phases in a perovskite crystalline structure: a phase for oxygen ion transport and a second phase for electron conduction.

U.S. Pat. No. 5,547,494 by Prasad et al., incorporated by reference in its entirety herein, discloses a process for separating oxygen from a feed air stream to produce enriched oxygen permeate and oxygen depleted retentate gas.

Multicomponent oxide compositions that exhibit oxygen-ion conduction have been developed. These compositions can be utilized to separate pure $O_2$ from $O_2$-containing gas streams. Table 1 given below provides a partial list of mixed conductors which can be used to separate oxygen.

Because the separation of oxygen from various gas mixtures by solid electrolyte ionic conductors requires maintaining the oxygen selective transport membranes at very high temperatures, large energy costs are typically incurred in maintaining their operation. In addition, production of purified oxygen to be used throughout an industrial microelectronic facility fails to effectively target costly UHP oxygen at only those particular sites requiring oxygen free of contaminants. The present invention overcomes both of these obstacles by targeting the purified oxygen production at the silicon oxidation furnace and by advantageously utilizing the heat source for the furnace to provide heat for maintaining a desired elevated temperature to the oxygen selective transport membrane cell.

An important advantage of operating the oxygen transport membrane cell at approximately the same elevated temperature as that of the silicon oxidation furnace is that both the reactor and the membrane can be integrated together directly without the need for special piping or equipment.

Any mixed conductor ceramic membrane may be used with this invention. Mixed conductor perovskites and dual phase metal-metal oxide combinations disclosed in the references cited above may be particularly suitable. It is preferred the membranes be tube-shaped. It is also preferable to use thin, strong membranes that have high oxygen vacancy concentrations for high oxygen flux, yet have sufficient tube strength to maintain an acceptable reliability. It is most preferred to have the purge gas stream flow through the inside of the tubes and air flow on the outside. Alternatively, air could be passed on the inside of tubes and the purge gas could be passed on the outside. This invention could also be practiced with other membrane structures (e.g. flat plates of ceramic membrane material) instead of tubes.

It may also be desirable for some applications to pack the tube with catalyst material or inert material.

The mixed conductor ceramic membrane may be any material that selectively conducts oxygen ions. The following table gives several examples of such materials.

TABLE I

Mixed Conducting Solid Electrolytes

Material Composition

1. $(La_{1-x}Sr_x)(Co_{1-y}Fe_y)O_{3-\delta}$ ($0 \leq x \leq 1$, $0 \leq y \leq 1$, $\delta$ from stoichiometry)
2. $SrMnO_{3-\delta}$ ($\delta$ from stoichiometry)
   $SrMn_{1-y}Co_yO_{3-\delta}$ ($0 \leq y \leq 1$, $\delta$ from stoichiometry)
   $Sr_{1-x}Na_xMnO_{3-\delta}$ ($0 \leq x \leq 1$, $\delta$ from stoichiometry)
3. $BaFe_{0.5}Co_{0.5}YO_3$
   $SrCeO_3$
   $YBa_2Cu_3O_{7-\delta}$ ($0 \leq \delta \leq 1$, $\delta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-\delta}$ ($x,x',x'',y,y',y''$ all in 0–1 range)
   Where: A,A',A" = from groups 1,2,3 and f-block lanthanides
   B,B',B" = from d-block transition metals
   $\delta$ from stoichiometry
6. (a) Co—La—Bi type:
   | | | |
   |---|---|---|
   | | Cobalt oxide | 15–75 mole % |
   | | Lanthanum oxide | 13–45 mole % |
   | | Bismuth oxide | 17–50 mole % |

(b) Co—Sr—Ce type:
   | | | |
   |---|---|---|
   | | Cobalt oxide | 15–40 mole % |
   | | Strontium oxide | 40–55 mole % |
   | | Cerium oxide | 15–40 mole % |

(c) Co—Sr—Bi type:
   | | | |
   |---|---|---|
   | | Cobalt oxide | 10–40 mole % |
   | | Strontium oxide | 5–50 mole % |
   | | Bismuth oxide | 35–70 mole % |

(d) Co—La—Ce type:
   | | | |
   |---|---|---|
   | | Cobalt oxide | 10–40 mole % |
   | | Lanthanum oxide | 10–40 mole % |
   | | Cerium oxide | 30–70 mole % |

(e) Co—La—Sr—Bi type:
   | | | |
   |---|---|---|
   | | Cobalt oxide | 15–70 mole % |
   | | Lanthanum oxide | 1–40 mole % |
   | | Strontium oxide | 1–40 mole % |
   | | Bismuth oxide | 25–50 mole % |

(f) Co—La—Sr—Ce type:
   | | | |
   |---|---|---|
   | | Cobalt oxide | 10–40 mole % |
   | | Lanthanum oxide | 1–35 mole % |
   | | Strontium oxide | 1–35 mole % |
   | | Cerium oxide | 30–70 mole % |

7. $Bi_{2-x-y}M'_xM_yO_{3-\delta}$ ($0 \leq x \leq 1$, $0 \leq y \leq 1$, $\delta$ from stoichiomety)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s,t,u,v,w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A,A',B,B', B" in the formula; and $0.9 < (s + t)/(u + v + w) < 1.1$
10. One of the materials of $La_{1-x}Sr_xCu_{1-y}M_yO_{3-}$ family, where:
    M represents Fe or Co;
    x equals from zero to about 1;
    y equals from zero to about 1;
    $\delta$ equals a number that satisfies the valences of La, Sr, Cu, and M in the formula
11. One of the materials of $Ce_{1-x}A_xO_{2-\delta}$ family, where:
    A represents a lanthanide, Ru, or Y; or a mixture thereof;
    x equals from zero to about 1;
    $\delta$ equals a number that satisfies the valences of Ce and A in the formula
12. One of the materials of $Sr_{1-x}Bi_xFeO_{3-\delta}$ family, where:
    A represents a lanthanide, or Y, or a mixture thereof;
    x equals from zero to about 1;
    $\delta$ equals a number that satisfies the valences of Ce and A in the formula

TABLE I-continued

Mixed Conducting Solid Electrolytes

Material Composition

13. One of the materials of $Sr_xFe_yCo_zO_{3-\delta}$ family, where:
    x equals from zero to about 1;
    y equals from zero to about 1;
    δ equals a number that satisfies the valences of Sr, Bi and Fe in the formula
14. Dual phase mixed conductors (electronic/ionic):

$(Pd)_{0.5}/(YSZ)_{0.5}$
$(Pt)_{0.5}/(YSZ)_{0.5}$
$(LaCr_{1-y}Mg_yO_{3-\delta})_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}$
$(In_{95\%}Pr_{2.5\%}Zr_{2.5\%})_{0.5}/(YSZ)_{0.5}$
Any of the materials described in 1–13, to which a high temperature metallic phase (e.g, Pd, Pt, Ag, Au, Ti, Ta, W) is added FIG. 1 schematically illustrates the integration of a closed-tube membrane cell 1 into the hot zone 3 of an oxidation furnace 5, with the input gas tubing seal 7 in a cool region (20 to 500%) allowing for the exhaust of retentate 9 in order to avoid the accumulation of membrane-impermeable components of feed gas 2. The retentate tube 9 preferably extends only a short distance into membrane tube 13, proximate the tube and seal 7. The retentate stream is presently controlled by a flow resistance element 10, such as a valve, orifice, or regulator, to ensure suitable residence time after feed gas in the oxygen transport membrane tube 13. Feed gas 2 in the temperature range 20–500% is provided to an inlet tube 11, inserted within a ceramic membrane tube 13, preferably closed at the distal end and sealed to the ceramic membrane tube 13 with a mechanical, input gas tubing seal 7. The inlet tube preferably extends the length of the membrane tube 13 in order to ensure sufficient heating of the inlet fluid as well as to ensure effective use of the oxygen transport membrane 15. The end plate 21 incorporates provisions for loading and unloading wafers from the furnace 5. Oxygen ions are selectively transported across the membrane 15 in order to provide high purity oxygen which is collected by a transparent, preferably quartz receiver tube 17. The receiver tube 17 is sealed to the ceramic membrane tube 13 with a mechanical seal 19. The receiver tube 17 conducts the oxygen to the reactor through the furnace end-plate 21 into the furnace tube 23. Both the ceramic membrane 13 and the silicon wafers 25 are preferably heated by a resistive heater 27 in the form of a helical coil extending the length of the furnace which may consist of several independently controlled zones. The silicon wafers 25 are preferably placed flat, perpendicular to the axis of the furnace tube 13. Waste gas is conducted from the oxidation furnace 5 through an exhaust port 29.

By isolating the atmosphere inside the oxidation furnace 5 from the material comprising the ceramic membrane tube 13, contamination of the silicon wafers 25 is minimized. For example, the ceramic membrane tube 13 may contain contaminants, such as copper (Cu), which degrade the electrical properties of silicon dioxide, and it is essential to remove these contaminants in order to provide contaminant-free high purity oxygen to the oxidation furnace 5. Note that the configuration of the ceramic membrane tube 13 relative to the oxidation furnace 5 illustrated in FIG. 1 facilitates easy adoption with minimal changes to existing oxidation furnaces.

Figure 2:
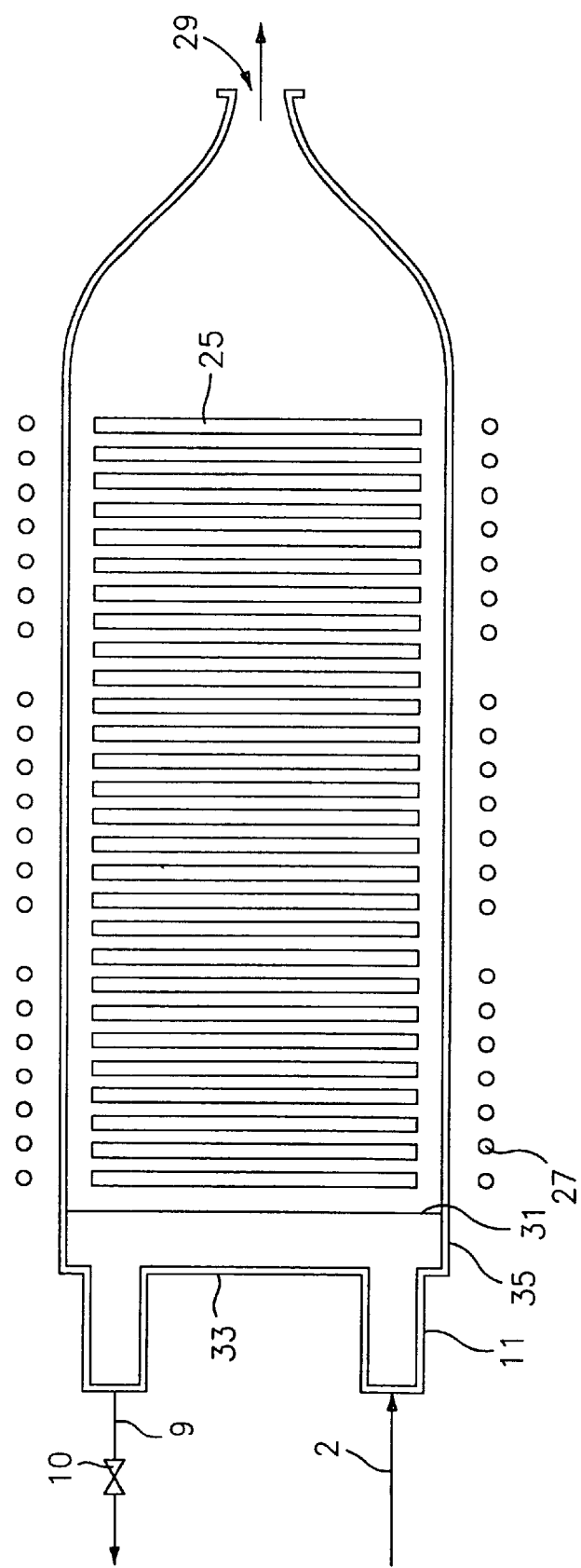
FIG. 2 is a schematic diagram of a ceramic membrane tube integrated with the operation of an oxidation furnace said ceramic membrane located flush with said furnace at the end opposite the exhaust opening.

FIG. 2 schematically illustrates an alternative placement of the inlet tube 11 with respect to the oxidation furnace 5. Feed gas 2 is introduced through an inlet tube 11 into a cavity between a ceramic membrane 31 and a sealing plate 33. The sealing plate 33 is sealed to the ceramic membrane by a mechanical seal 35. The waste gas is exhausted through an exhaust port 29. Retentate is exhausted through an exhaust port 9.

Figure 3:
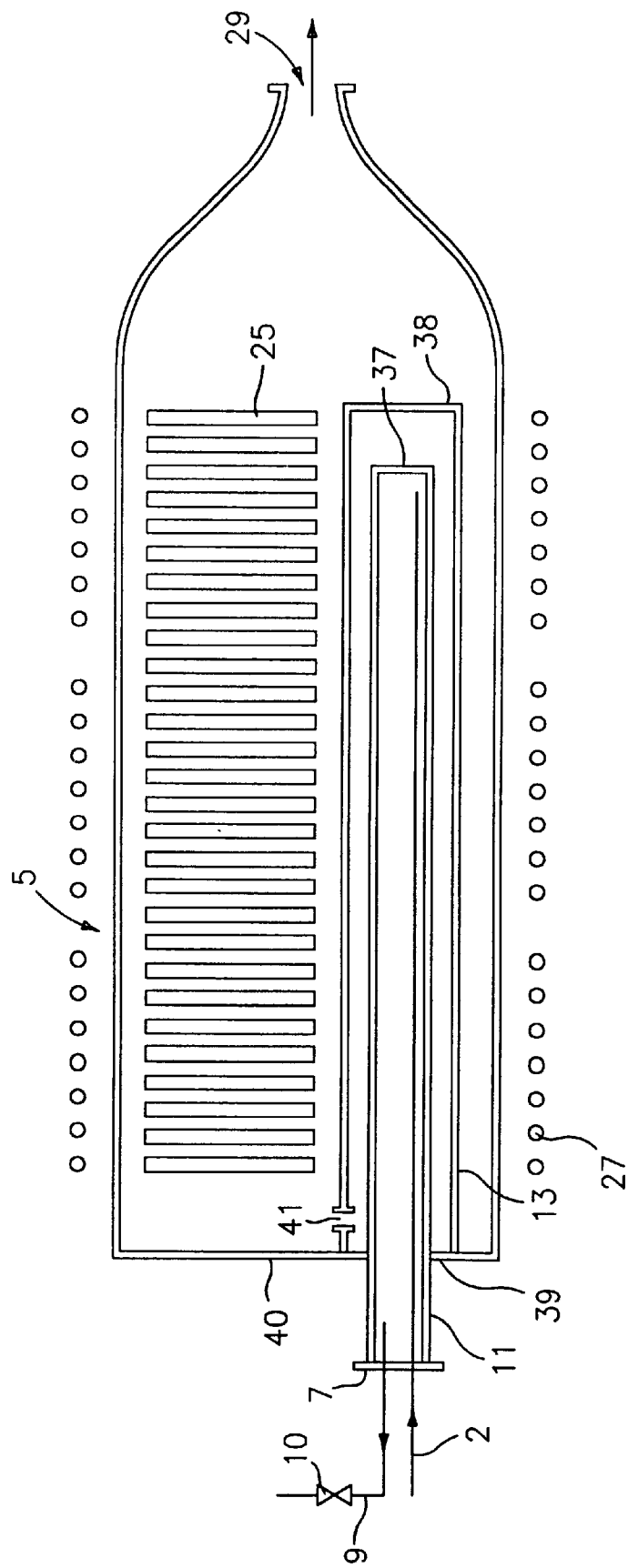
FIG. 3 is a schematic diagram of a ceramic membrane tube integrated with the operation of an oxidation furnace said ceramic membrane largely enclosed within said oxidation furnace.

FIG. 3 schematically illustrates yet another alternative placement of the inlet tube 11 with respect to the oxidation furnace 5. In this configuration, feed gas 2 is introduced into ceramic membrane tube 13 at input gas tubing seal 7 through inlet tube 11. The ceramic membrane tube 13 is sealed at both end plate 40 and seal 39. Retentate 9 is exhausted through inlet tube 11. In this configuration, a protective flow regulation tube 38 could be used surrounding transport membrane tube 13 having appropriate outlet passages, for example a single outlet 41 proximate the furnace end plate 40.

Regardless of the configuration of the ceramic membrane tube 13 relative to the oxidation furnace 5, a variety of different feed compositions can be utilized. Suitable compositions include air, oxygen enriched air (such as off gas from a nitrogen generating plant), or crude oxygen (advantageously between 98 and 99.8% pure). Virtually all ceramic membrane compositions, including dense ceramics and supported membranes, in tubes, monoliths, or sheets, are potentially useful in the present invention, as long as these membranes have acceptable oxygen fluxes at oxygen pressures between 15 psig and 90 psig, at operating temperatures between 600 and 1400° C., and exhibit low defect levels with leak rates less than 6 sccm.

EXAMPLE 1

Calculations for this example were performed with the assumption of the production by the oxygen transport membrane cell of 5 liters/minute of ultra-high purity oxygen. For purposes of these calculations, the membrane used was a mixed conductor ceramic membrane having the following properties:

| Nature of membrane | thin oxygen-selective membrane on a porous substrate |
|---|---|
| Substrate porosity | 40% |
| Effective membrane thickness | 40 microns |
| Oxygen ion conductivity | 0.5 S/cm |
| Operating temperature (isothermal) | 900° C. |

Assuming that the ceramic membrane tubes are fabricated to be six feet long and one inch in diameter, these models show several different possible configurations. By minimizing the integral number of ceramic membrane tubes needed to be employed, and maximizing the oxygen recovery, configurations are realizable which require only relatively low capital expenditure and low additional operating expenses. The operating conditions for three feed compositions are given in Table 2.

TABLE 2

| Feed Composition | Feed Pressure | % Oxygen Recovered | Number of Tubes | Oxygen Content in waste |
|---|---|---|---|---|
| 99.5% | 100 psig | 99.5% | 2 | 50% |
| 90% | 100 psig | 83% | 2 | 60% |
| 20.9% (air) | 200 psig | 33% | 4 | 15% |

While the invention has been described most particularly with oxygen selective ion transport membranes that conduct both oxygen ions and electrons, where the required driving force to transport the ions is provided by a lower oxygen partial pressure at the anode side of the membrane, it is possible to utilize materials that conduct oxygen ions only. In that event, electrodes and an external circuit are required for the transport of electrons.

What is claimed is:

1. An integrated system for producing high purity silicon dioxide comprising:

a) a source of an oxygen-containing feed gas containing at least one impurity, b) an oxygen transport membrane cell containing an oxygen-selective transport membrane that has a cathode side and an opposing anode side, said membrane being at an elevated temperature effective for separation of oxygen in said feed gas from said impurity by transporting oxygen ions from said oxygen-containing feed gas through said membrane to said anode to form a purified oxygen permeate on said anode side, while retaining an oxygen-depleted, impurity-containing retentate on said cathode side, c) a passageway from said source (a) to the cathode side of said membrane cell, d) silicon wafers, and e) a silicon oxidation furnace, in communication with said anode side of said membrane cell, for reaction of said purified oxygen permeate with silicon from said silicon wafers, at an elevated reaction temperature effective for said reaction, in order to produce said high purity silicon dioxide.

2. The integrated system of claim 1 which additionally comprises:

(f) a heating source for providing said elevated temperature of (b) and said elevated reaction temperature of (e).

3. The heating source of claim 2 which is selected from the group consisting of resistive heaters, conductive heaters, convection heaters, and combinations thereof.

4. The integrated system of claim 1 additionally comprising an inlet tube for transmitting said feed gas to said membrane.

5. The integrated system of claim 1 additionally comprising an exhaust port for transmitting exhaust gas from said furnace.

6. The integrated system of claim 1 wherein said oxygen-containing feed gas is air, wherein said impurity comprises nitrogen, and wherein said retentate comprises nitrogen.

7. A process for producing a pure silicon dioxide coating on a substrate comprising contacting a surface of the substrate with silicon dioxide produced using the integrated system of claim 1.

8. A method for preparing high purity silicon dioxide comprising the steps of:

a) feeding an oxygen-containing feed gas into a cathode side of an oxygen transport membrane cell containing said cathode side and an anode side, with an oxygen transport membrane therebetween, b) selectively transporting oxygen ions from said oxygen-containing feed gas from said cathode side through said membrane to said anode side to provide a purified oxygen permeate, c) reacting said purified oxygen permeate with silicon of silicon wafers located in a silicon oxidation furnace to form said high purity silicon dioxide.

9. The method of claim 8 wherein step b), is effected at an elevated temperature of from about 450 to about 1200 degrees Centigrade.

10. The method of claim 8 wherein step c) is effected at an elevated temperature of from about 450 to about 1200 degrees Centigrade.

11. The method of claim 8 wherein steps b) and c) are each effected at an elevated temperature provided by heat from a heating source selected from the group consisting of resistive heaters, conductive heaters, convection heaters, and combinations thereof.

12. The method of claim 8 wherein step b) is effected in a pressure drive mode whereby said oxygen ions are transported from said cathode side through said membrane to said anode side by means of a lower oxygen partial pressure at the anode side of the membrane relative to that at the cathode side.

13. An integrated system for the delivery of high purity oxygen to a silicon oxidation furnace and for using the high purity oxygen to prepare high purity silicon dioxide comprising:

a) an oxygen transport membrane cell containing an oxygen selective ion transport membrane that has a cathode side and an opposing anode side and is at a temperature effective for the transport of oxygen ions from said cathode side to said anode side, b) an oxygen-containing feed gas contacting said cathode side wherein oxygen ions from said feed gas are transported to said anode side to provide an oxygen permeate, and an oxygen-depleted retentate is retained as an effluent stream on said cathode side, c) reacting a reaction mixture comprising said oxygen permeate and silicon from silicon wafers located in a silicon oxidation furnace heated to an elevated temperature sufficient to react the reaction mixture, thereby forming said high purity silicon dioxide.

14. The integrated system of claim 13 additionally comprising a heating source selected from the group consisting of resistive heaters, conductive heaters, convection heaters, and combinations thereof.

15. The integrated system of claim 13 wherein the ion transport membrane comprises a mixed oxide perovskite material.

16. The integrated system of claim 13 wherein said elevated temperature is in the range of from about 900 to about 1200 degrees Centigrade.

* * * * *